United States Patent
Yamada et al.

(10) Patent No.: US 9,705,233 B2
(45) Date of Patent: Jul. 11, 2017

(54) CONNECTOR

(71) Applicants: MOLEX INCORPORATED, Lisle, IL (US); Eiichi Yamada, Yamato (JP); Koji Chikano, Yamato (JP)

(72) Inventors: Eiichi Yamada, Yamato (JP); Koji Chikano, Yamato (JP)

(73) Assignee: Molex, LLC, Lisle, IL (US)

( * ) Notice: Subject to any disclaimer, the term of this patent is extended or adjusted under 35 U.S.C. 154(b) by 0 days.

(21) Appl. No.: 14/780,917

(22) PCT Filed: Apr. 10, 2014

(86) PCT No.: PCT/US2014/033590
§ 371 (c)(1),
(2) Date: Sep. 28, 2015

(87) PCT Pub. No.: WO2014/169090
PCT Pub. Date: Oct. 16, 2014

(65) Prior Publication Data
US 2016/0056565 A1    Feb. 25, 2016

(30) Foreign Application Priority Data

Apr. 10, 2013    (JP) ................................. 2013-082481

(51) Int. Cl.
H01R 4/22     (2006.01)
H01R 13/502   (2006.01)
(Continued)

(52) U.S. Cl.
CPC ....... H01R 13/502 (2013.01); H01R 13/5202 (2013.01); H01R 13/5213 (2013.01);
(Continued)

(58) Field of Classification Search
CPC ... H01R 13/502; H01R 13/5213; H02S 40/34; H01G 3/16
(Continued)

(56) References Cited

U.S. PATENT DOCUMENTS 6,344,612 B1   2/2002   Kuwahara et al.
7,632,109 B2 *   12/2009   Boensch ........... H01L 31/02013
                                                               439/521
(Continued)

FOREIGN PATENT DOCUMENTS

CN    201562931 U    8/2010
CN    202172078 U    3/2012
(Continued)

Primary Examiner — Abdullah Riyami
Assistant Examiner — Nader Alhawamdeh
(74) Attorney, Agent, or Firm — James A. O'Malley

(57) ABSTRACT

To lengthen the insulating distance from a conductive member to the outer surface of a housing while curtailing any increase in the size of a connector, a plurality of ribs are formed on a cover which protrude towards a housing and surround the outer periphery of a housing chamber in the housing. Grooves are formed in the housing for insertion of the ribs. The plurality of ribs provided in the cover include a first rib positioned in the longitudinal direction relative to the housing chamber, and a second rib positioned on the side of the housing chamber with an opening for insertion of another connector.

19 Claims, 5 Drawing Sheets

(51) Int. Cl.
*H01R 13/52* (2006.01)
*H02G 3/16* (2006.01)
*H02S 40/34* (2014.01)
*H02G 3/08* (2006.01)
*H02G 3/06* (2006.01)

(52) U.S. Cl.
CPC ............... *H02G 3/16* (2013.01); *H02S 40/34* (2014.12); *H02G 3/0616* (2013.01); *H02G 3/088* (2013.01)

(58) Field of Classification Search
USPC ........................................................ 439/521
See application file for complete search history.

(56) References Cited

U.S. PATENT DOCUMENTS

| | | | |
|---|---|---|---|
| 7,824,189 | B1 | 11/2010 | Lauermann et al. |
| 8,444,429 | B2 | 5/2013 | Ebihara et al. |
| 2010/0075531 | A1* | 3/2010 | Beck ................ H01L 31/02013 439/405 |
| 2010/0263714 | A1* | 10/2010 | Lauermann ............. H02S 40/34 136/251 |
| 2011/0139483 | A1 | 6/2011 | Richter |
| 2011/0220187 | A1 | 9/2011 | Wang et al. |
| 2011/0275232 | A1* | 11/2011 | Duesterhoeft .......... H02S 40/34 439/276 |
| 2011/0297442 | A1* | 12/2011 | Sulzer .................. H01R 13/502 174/88 R |
| 2011/0300741 | A1* | 12/2011 | Spicer .................... H02S 40/34 439/460 |
| 2012/0048614 | A1* | 3/2012 | Xue ......................... H02G 3/16 174/520 |
| 2013/0050956 | A1* | 2/2013 | Wang .................... H01R 13/502 361/728 |
| 2016/0056565 | A1* | 2/2016 | Yamada ............. H01R 13/5213 439/521 |

FOREIGN PATENT DOCUMENTS

| | | |
|---|---|---|
| JP | 3069523 U | 6/2000 |
| JP | 2002-359389 A | 12/2002 |
| KR | 2011-0117578 A | 10/2011 |
| WO | WO 2010/047345 A1 | 4/2010 |

\* cited by examiner

CONNECTOR

CROSS REFERENCE TO RELATED APPLICATIONS

The Present Disclosure claims priority to prior-filed Japanese Patent Application No. 2013-082481, entitled "Connector," filed on 10 Apr. 2013 with the Japanese Patent Office. The content of the aforementioned Patent Application is fully incorporated in its entirety herein.

BACKGROUND OF THE PRESENT DISCLOSURE

The Present Disclosure relates, generally, to connectors mounted on a plurality of photovoltaic panels and connected to each other via a cable.

Photovoltaic systems usually include a plurality of photovoltaic panels. These photovoltaic panels are typically arranged in vertical and/or lateral rows and connected to each other via cables. A connector for connecting the cable is mounted on each panel. A connector used for this purpose has been disclosed in Japanese Utility Model Patent No. 3069523, the content of which is hereby incorporated herein in its entirety. This connector has a housing (a box housing main body) for housing a conductive member (a terminal plate) which is connected to the electric wires in the cable. The housing is box-shaped and is open on the top. The top of the housing is closed using a cover (a cover plate).

In order ensure that the insulating properties for the conductive member are sufficient, the distance from the conductive member to the outer surface of the housing is preferably as great as possible (the spatial distance or creepage distance, which is referred to as the insulating distance below). However, the size of the connector is increased when the insulating distance is lengthened.

SUMMARY OF THE PRESENT DISCLOSURE

It is an object of the Present Disclosure to provide a connector in which the insulating distance from the conductive member to the outer surface of the housing can be lengthened while curtailing any increase in the size of a connector.

Accordingly, the Present Disclosure is a connector including a housing having a housing chamber open in a first direction and an opening formed in a second direction orthogonal to the first direction for insertion of another connector provided at the end of a cable. Conductive members housed inside the housing chamber and connected to terminals on the other connector. A cover mounted on the housing in the first direction for closing the housing chamber. A plurality of ribs formed on one of either the cover or the housing, protruding in the other direction, and surrounding the outer periphery of the housing chamber. A plurality of grooves formed on the other of either the cover or the housing for receiving the plurality of ribs. The plurality of ribs include a first rib positioned with respect to the housing chamber in a third direction orthogonal to both the first direction and the second direction, and a second rib positioned on the opening side with respect to the housing chamber. This connector is able to lengthen the insulating distance from the conductive member to the outer surface of the housing while curtailing any increase in the size of a connector.

In the connector of the Present Disclosure, the protruding length of the second rib may be smaller than the first rib. This can curtail interference between the second rib and the conductive member or the terminals of the other connector, and lengthen the insulating distance in the direction from the conductive member to the opening for receiving the inserted connector. The plurality of ribs may include a plurality of second ribs positioned on the opening side with respect to the housing chamber. This can lengthen the insulating distance in the direction from the conductive member to the opening for receiving the inserted connector.

In the connector of the Present Disclosure, the housing has two openings positioned on opposite ends from each other in the second direction for receiving two other inserted connectors, the plurality of ribs including two first ribs positioned on opposite sides of the housing chamber from each other in the third direction, and two second ribs positioned on opposite sides of the housing chamber from each other in the second direction. This can lengthen the insulating distance in a connector receiving two other inserted connector.

In the connector of the Present Disclosure, a hook is formed on one of either the cover or the housing to hook the other one. The hook surrounds the plurality of ribs and the housing chamber, and is connected to the first rib. Because the first rib is connected to the hook, the insulating performance of the connector can be improved.

The connector of the Present Disclosure may also include a ring-shaped sealing member for sealing the space between the cover and the housing, and the sealing member may be arranged to the inside of the plurality of ribs. This can seal the space between the cover and the housing while curtailing any increase in the size of the connector.

BRIEF DESCRIPTION OF THE FIGURES

The organization and manner of the structure and operation of the Present Disclosure, together with further objects and advantages thereof, may best be understood by reference to the following Detailed Description, taken in connection with the accompanying Figures, wherein like reference numerals identify like elements, and in which.

DESCRIPTION OF THE PREFERRED EMBODIMENTS

While the Present Disclosure may be susceptible to embodiment in different forms, there is shown in the Figures, and will be described herein in detail, specific embodiments, with the understanding that the Present Disclosure is to be considered an exemplification of the principles of the Present Disclosure, and is not intended to limit the Present Disclosure to that as illustrated.

As such, references to a feature or aspect are intended to describe a feature or aspect of an example of the Present Disclosure, not to imply that every embodiment thereof must have the described feature or aspect. Furthermore, it should be noted that the description illustrates a number of features. While certain features have been combined together to illustrate potential system designs, those features may also be used in other combinations not expressly disclosed. Thus, the depicted combinations are not intended to be limiting, unless otherwise noted.

In the embodiments illustrated in the Figures, representations of directions such as up, down, left, right, front and rear, used for explaining the structure and movement of the various elements of the Present Disclosure, are not absolute, but relative. These representations are appropriate when the elements are in the position shown in the Figures. If the description of the position of the elements changes, however, these representations are to be changed accordingly.

Figure 1:
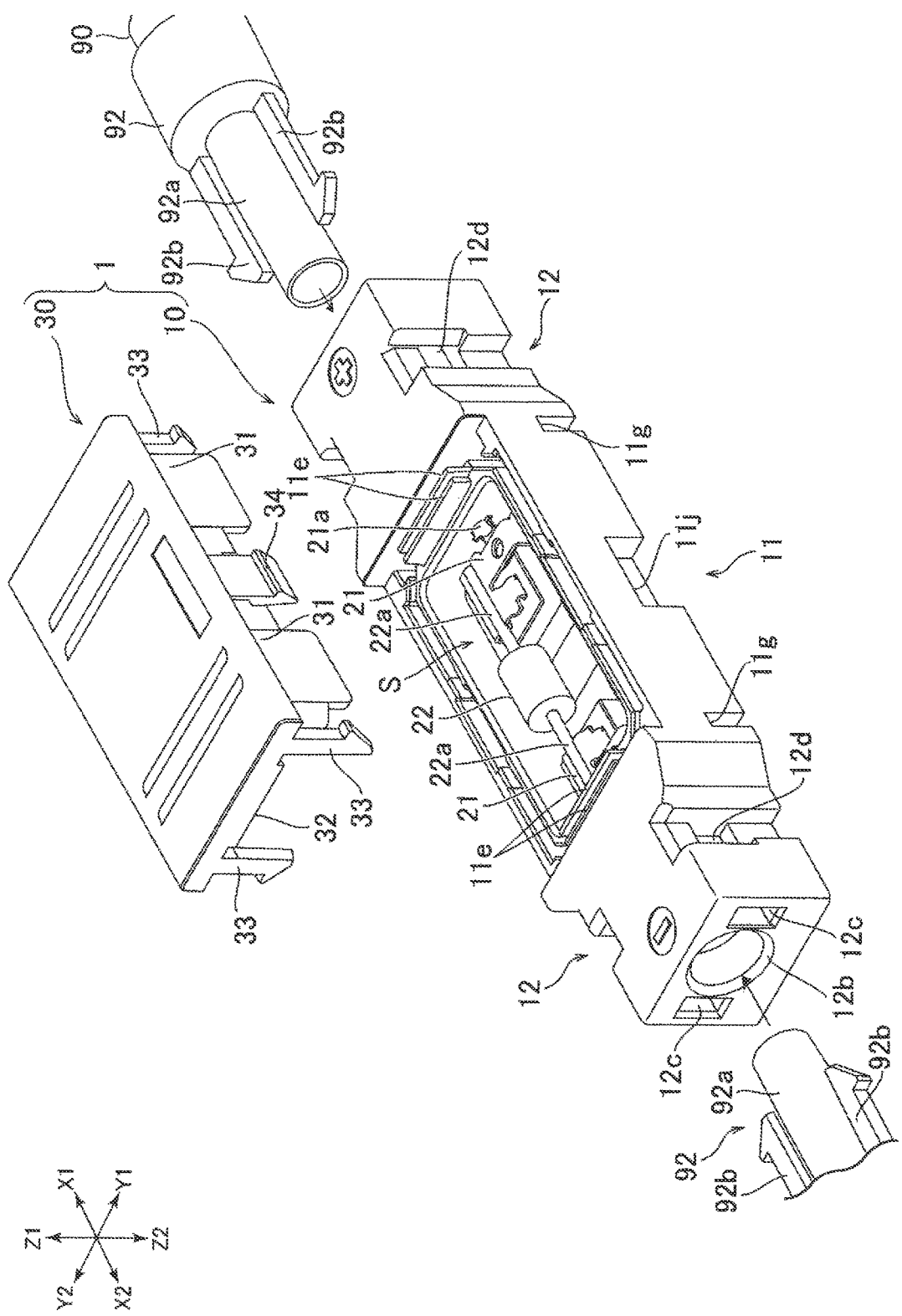
FIG. 1 is an exploded perspective view of a connector according to an embodiment of the Present Disclosure.

With reference to the Figures, when used, the connector 1 is mounted on a photovoltaic panel (not shown). The connector 1 is also connected to another connector 92 provided on the end of a cable 90 (see FIG. 1). The other end of the cable 90 is connected to a connector 1 on another photovoltaic panel, and the two photovoltaic panels are connected to each other electrically via the cable 90 and the connectors 1. The connector 1 described here can be connected to two cables 90. As shown in FIG. 1, the connector 1 has a housing 10 and a cover 30 attached to the housing 10. The housing 10 and the cover 30 are made of an insulating material such as a plastic.

Figure 2:
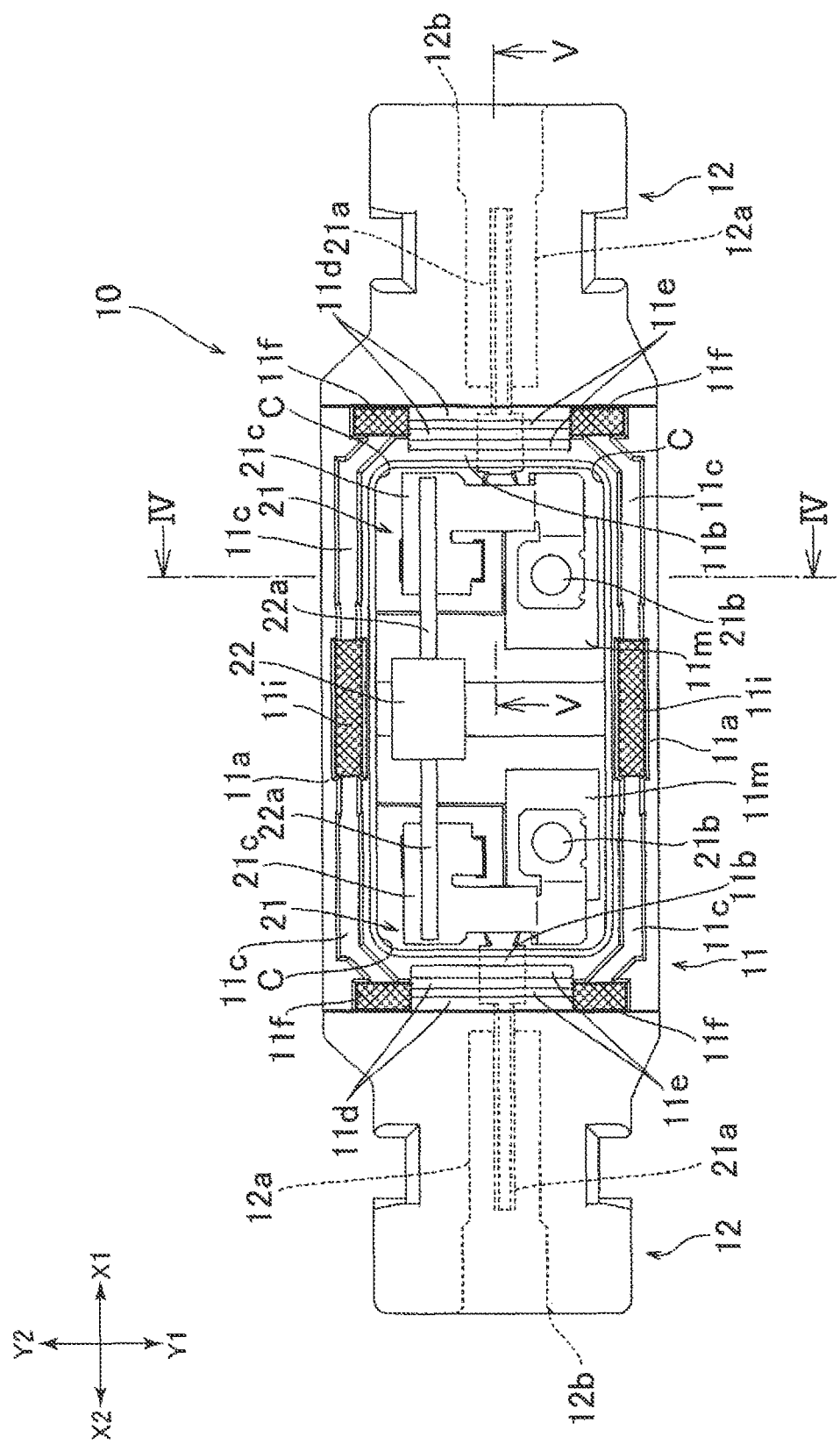
FIG. 2 is a plan view of the housing of the connector of FIG. 1.

As shown in FIGS. 1-2, the housing 10 has a housing main body 11 in the central section. The housing main body 11 is box-shaped and has a housing chamber S inside which houses a conductive member 21. The conductive member 21 is connected to a receptacle terminal (not shown) on another connector 92. The conductive member 21 can be made by bending a metal plate at several locations. The housing chamber S is open on the top. The cover 30 is attached to the housing main body 11 in the vertical direction and is used to close the housing chamber S. When the cover 30 is attached to the housing main body 11, the top surface of the cover 30 is flush with the top surface of the rest of the housing 10 (the coupling portion 12 in this explanation).

As shown in FIG. 1, the housing 10 has a coupling portion 12 on the side. In this example, the housing 10 has two coupling portions 12 on opposite sides of the housing main body 11 from each other. The two coupling portions 12 extend from the housing main body 11 in the leftward direction and the rightward direction. In this example, the other connector 92 has a cylindrical mated portion 92a, and an opening 12b is formed in the coupling portions 12 for receiving the inserted mated portion 92a. The opening 12b is formed in a direction orthogonal to the direction in which the housing chamber S opens (upward) so that the inserted mated portion 92a of the cable 90 can be received. In this example, the opening 12b formed in the coupling portion 12 on the left and the opening 12b formed in the coupling portion 12 on the right open to the left and right, respectively. An insertion hole 12a extending towards the housing chamber S from the opening 12b is formed in the coupling portion 12. The mated portion 92a of the cable 90 is inserted into the insertion hole 12a via the opening 12b, and the receptacle terminal is connected to the conductive member 21 in the housing chamber S. The other connector 92 shown in FIG. 1 has a hook 92b on both sides of the mated portion 92a. The coupling portion 12 has a hole 12c on both sides of the opening 12b. The hooks 92h are mated with the holes 12c, and are hooked inside the coupling portion 12. More specifically, the deep portion of the holes 12c is connected to holes 12d formed in the side walls of the coupling portion 12, and the hooks 92b are hooked by the edges of these holes 12d.

Figure 5:
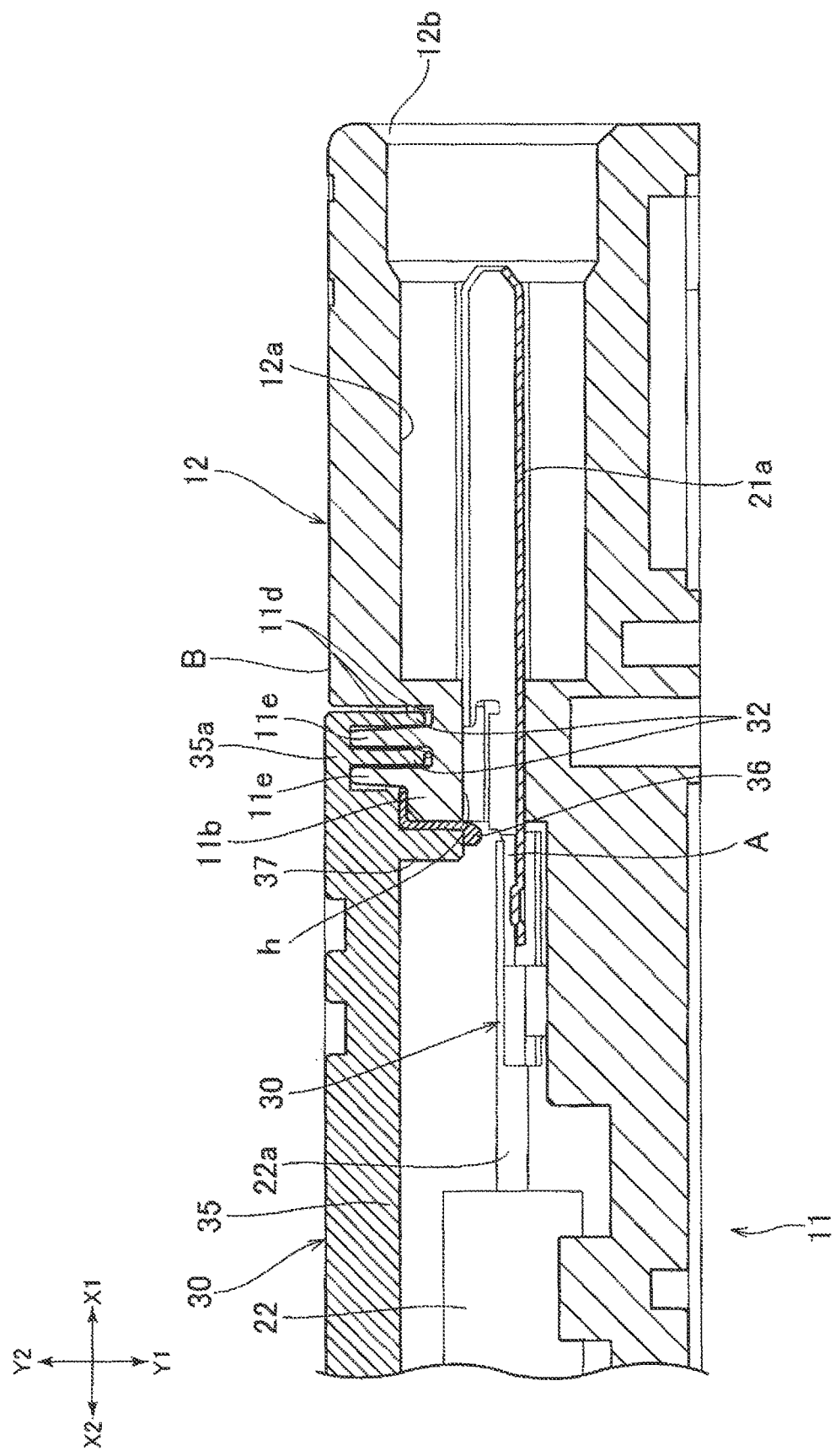
FIG. 5 is a cross-sectional view of the connector of FIG. 1 from Line V-V in FIG. 2.

As shown in FIG. 5, the conductive member 21 has a first connecting portion 21a connected to the receptacle terminals of the cable 90. In this example, the housing main body 11 has a side portion 11b, and a hole h passes through the side portion 11b in the lateral direction. The housing chamber S and the insertion hole 12a are connected via this hole h. The first connecting portion 21a extends from the conductive member 21 to the insertion hole 12a via the hole h. The first connecting portion 21a in this example is cylindrical. The receptacle terminal of the cable 90 is also cylindrical and has an open end. The receptacle terminal is connected to the outside of the first connecting portion 21a. The shape of the terminals in the first connecting portion 21a and the cable 90 can be changed if necessary.

Figure 3:
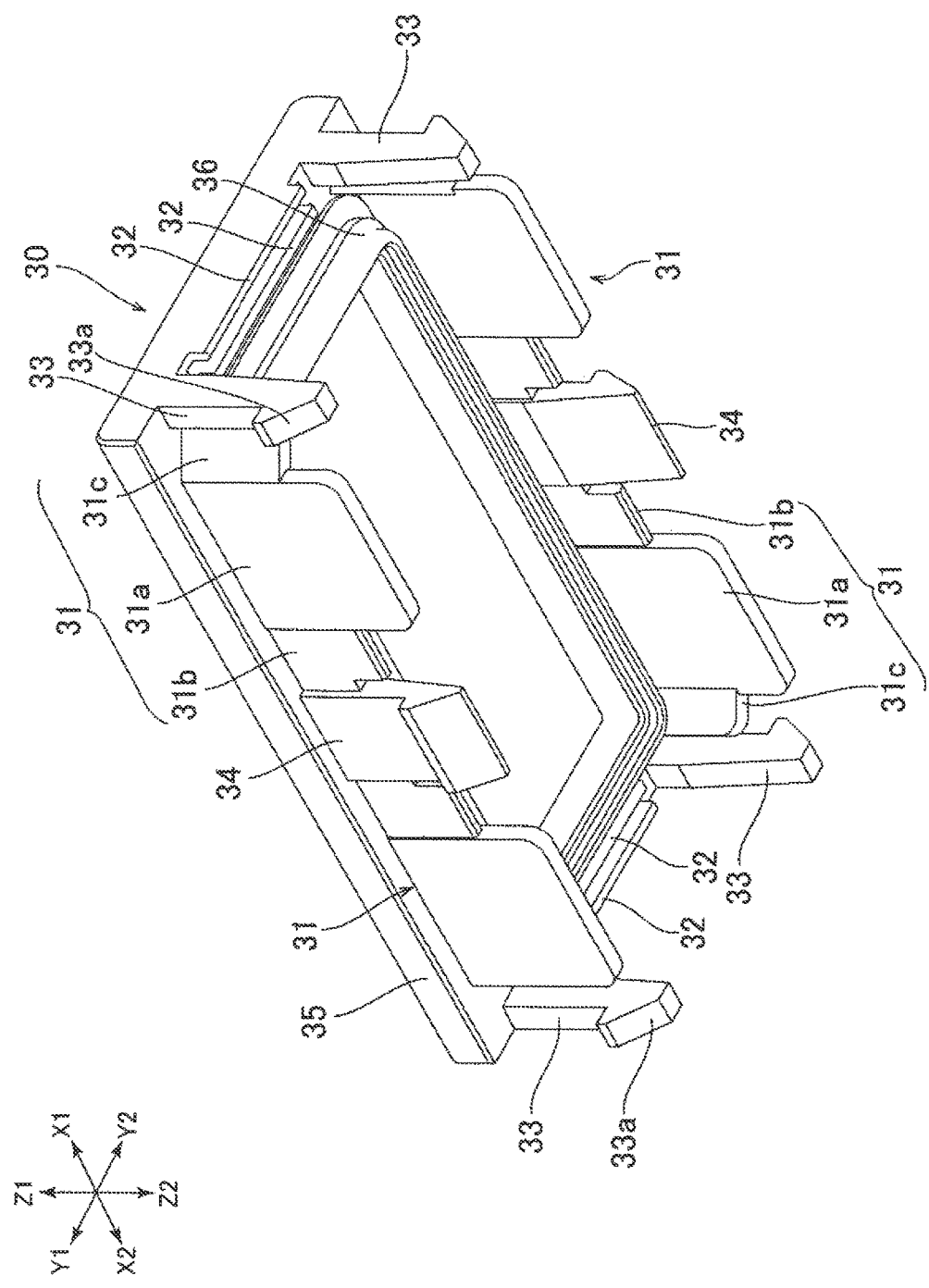
FIG. 3 is a perspective view from below of the cover of the connector of FIG. 1.
Figure 4:
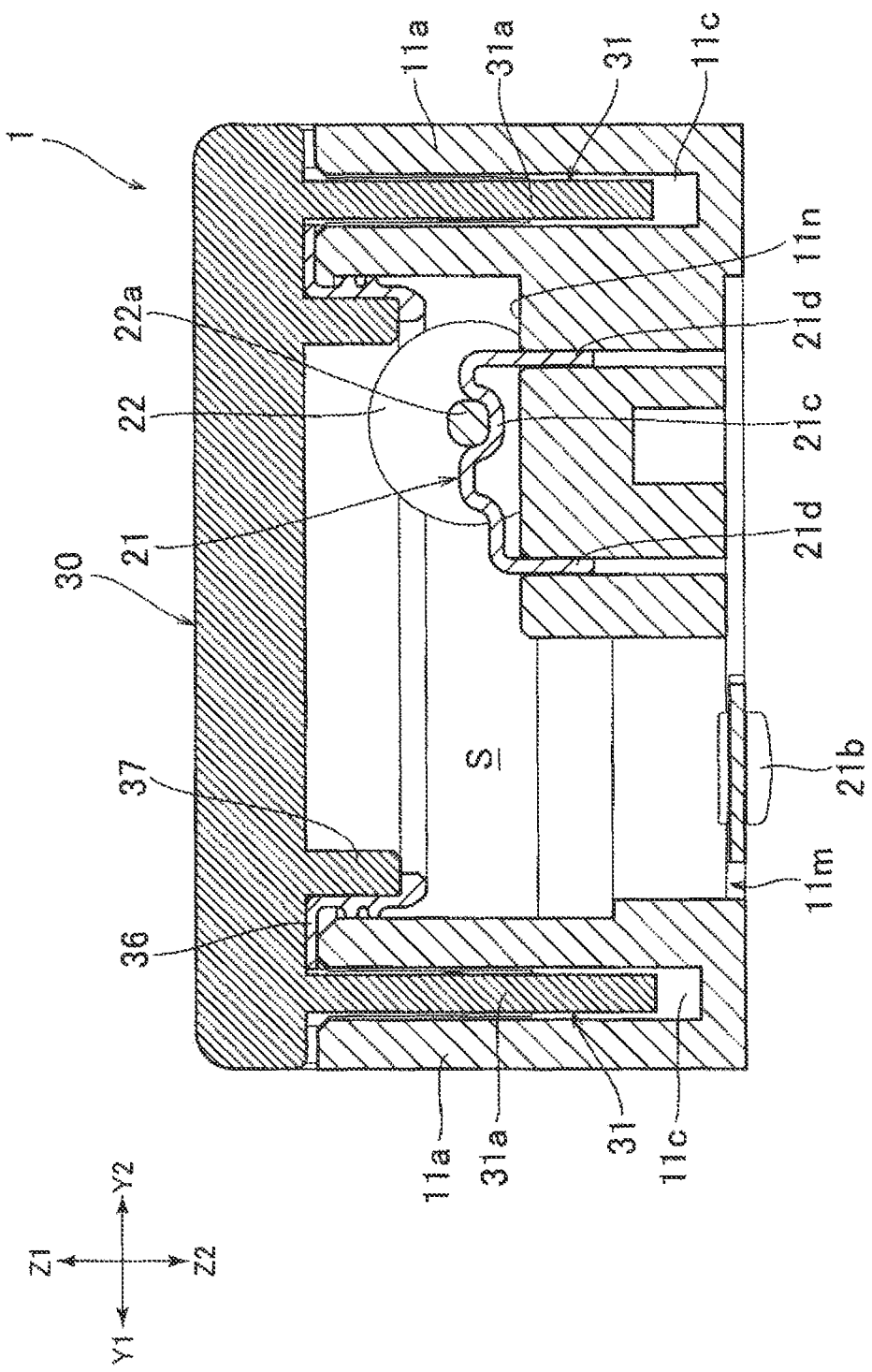
FIG. 4 is a cross-sectional view of the connector of FIG. 1 from Line IV-IV in FIG. 2.

As shown in FIGS. 2-4, the conductive member 21 has a second connecting portion 21b connected to the terminals (not shown) provided on the photovoltaic panel. An opening 11m is formed in the bottom surface of the housing main body 11. The second connecting portion 21b is arranged in the opening 11m so as to be exposed on the bottom. When the connector 1 is mounted on a photovoltaic panel, the second connecting portion 21b comes into contact with the terminals of the panel. The second connecting portion 21b can be soldered to the terminals of the panel. The portion between the base of the first connecting portion 21a and the second connecting portion 21b is tiered, and the conductive member 21 extends downward in tiers from the base of the first connecting portion 21a to the second connecting portion 21b.

As shown in FIG. 2, two conductive members 21 are arranged inside the housing chamber S. The two conductive members 21 are arranged so as to face each other from left to right, and are connected to each other via a diode 22. Each conductive member 21 has a third connecting portion 21c to which the electrical wires of the diode 22 are attached. The electrical wires 22a of the diode 22 can be attached to the third connecting portions 21c using soldering. The two conductive members 21 are symmetrical. The connector 1 does not have to be formed so that two cables 90 can be connected. In other words, the number of coupling portions 12 and the number of conductive members 21 can both be one.

As shown in FIG. 3, the cover 30 has a plurality of ribs 31, 32 protruding towards the housing 10 and surrounding the housing chamber S. More specifically, the cover 30 has a plurality of first ribs 31 positioned in front of and to the rear of the housing chamber S. The cover 30 also has a plurality of second ribs 32 positioned on the sides of the opening 12b receiving the inserted mated portion 92a, that is, positioned to the left and right of the housing chamber S. These ribs are arranged so as to completely surround the housing chamber S.

The cover 30 in this example has two second ribs 32 positioned on opposite sides of the housing chamber S from each other in the lateral direction. In this example, as explained below, there are two second ribs 32 provided to the left and right of the housing chamber S. The cover 30 also has two first ribs 31 positioned on opposite sides of the housing chamber S from each other in the longitudinal direction. As explained below, the two first ribs 31 are provided side by side in the lateral direction in front and to the rear of the housing chamber S.

Grooves 11c, 11d are formed in the housing main body 11 to receive the ribs 31, 32. More specifically, the housing main body 11 has wall portions 11a and side portions 11b defining the housing chamber S (FIGS. 4-5). The two wall portions 11a positioned opposite each other form the front surface and the rear surface of the housing chamber S. The two side portions 11b are positioned opposite each other on the left surface and the right surface of the housing chamber S. The grooves 11c in which the first ribs 31 are inserted are formed in the wall portions 11a (see FIG. 4). The grooves 11d in which the second ribs 32 are inserted are formed in the top surface of the side portions 11b (see FIG. 6).

The distance from the conductive member 21 to the outer surface of the housing 10 (the spatial distance or creepage distance, which is referred to as the insulating distance below) can be lengthened by the ribs 31, 32 without increasing the size of the connector 1. In other words, the insulating distance from the conductive member 21 to the front surface of the connector 1 and the insulating distance from the conductive member 21 to the rear surface of the connector 1 can be increased by the first ribs 31. Also, the insulating distance from the conductive member 21 (for example, from section A of the conductive member 21 inside the housing chamber S (see FIG. 5)) to the top surface B of the coupling portion 12 (see FIG. 5) can be increased by the second ribs 32.

As shown in FIG. 5, the second ribs 32 are positioned above the first connecting portion 21a. In other words, the second ribs 32 are positioned above the holes h formed in the side portions 11b of the housing main body 11. The second ribs 32 are wall-like and extend in the longitudinal direction. When viewed from above, the first connecting portions 21a, the holes h, and the receptacle terminal of the cable 90 intersect. The protruding length of the second ribs 32 is smaller than the first ribs 31. This can ensure that the insulating distance is sufficient in the lateral direction without interfering with the conductive member 21 and the second ribs 32. The positions of the second ribs 32 are not limited to the example described above. For example, they may be positioned above the insertion holes 12a.

As shown in FIG. 5, a plurality of second ribs 32 are arranged parallel to each other to the right of the housing chamber S. In other words, the plurality of second ribs 32 are positioned to the side of the opening 12b of the coupling portion 12 to the right of the housing chamber S. In this example, two second ribs 32 are formed to the right of the housing chamber S. Two parallel second ribs 32 are formed to the left of the housing chamber S in the same way. A larger insulating distance can be ensured by providing a plurality of second ribs 32 in the same direction relative to the housing chamber S.

As shown in FIG. 5, two grooves 11d receiving the two second ribs 32 are formed in the top surface of the side portions 11b of the housing main body 11. Two ribs 11e are formed in the top surface of the side portions 11b which protrude upward and extend parallel to each other in the longitudinal direction. The space between these two ribs 11e functions as a groove 11d.

Either one of side surfaces on which the second ribs 32 are formed in the cover 30 or on which the ribs 11e are formed in the housing main body 11 (the surface to the left or the right) can be formed on an incline. In this way, the insulating distance can be lengthened further. in this example, the side surface with the ribs 11e is inclined slightly relative to the vertical direction.

As shown in FIG. 5, the cover 30 has a ceiling portion 35 which is a rectangular plate constituting the top surface of the connector 1. The ceiling portion 35 has portions 35a on the left and right which overlap with the side portions 11b of the housing main body 11 (these portions 35a are referred to as the cover side portions below). A second rib 32 is formed in the cover side portions 35a. A hole is formed in the cover side portions 35a, and the second rib 32 extends from the bottom portion of the hole to the housing main body 11. This structure can increase the protruding lengths of both the second ribs 32 and the ribs 11e.

As shown in FIG. 3, a plurality of corner hooks 33 are formed in the cover 30. A corner hook 33 is provided at each of the four corners of the ceiling portion 35. The corner hooks 33 are rod-shaped and extend towards the housing 10. The housing main body 11 has holes 11 if corresponding to these four corners (the holes 11 f are shaded in FIG. 2 to make them more visible). In this example, the holes 11f pass vertically through the housing main body 11. The corner hooks 33 are inserted into these holes 11f and are hooked inside the housing 10. In this example, the corner hooks 33 in the front have engaging portions 33a on the end which protrude forward. The corner hooks 33 in the rear have engaging portions 33a on the end which protrude rearward. The engaging portions 33a engage the edges of notches 11g formed in the wall portions 11a of the housing main body 11 (see FIG. 1).

The second ribs 32 are positioned between the two corner hooks 33 extending in the longitudinal direction. In other words, the second ribs 32 and these two corner hooks 33 are arranged side by side in the longitudinal direction. The two grooves 11d receiving the two second ribs 32 are positioned between the two holes 11f extending in the longitudinal direction. This layout keeps the size of the housing main body 11 from increasing in the lateral direction.

As shown in FIG. 3, wall-like middle hooks 34 are formed in the cover 30 which extend towards the housing 10. The cover 30 has middle hooks 34 on both the front edge and the rear edge. The middle hook 34 in the front is positioned between the two corner hooks 33 in the front, and the middle hook 34 in the rear is positioned between the two corner hooks 33. Holes 11i are formed in the wall portions 11a of the housing main body 11 (the holes 11i in FIG. 2 are shaded). The middle hooks 34 are inserted into the holes 11i and hooked on the housing 10. By providing middle hooks 34 in the cover 30 in addition to the corner hooks 33 described above, the attachment strength of the cover 30 to the housing 10 can be increased. In this example, the middle hook 34 in the front has an engaging portion 34a on the end which protrudes forward. The middle hook 34 in the rear has an engaging portion 34a on the end which protrudes rearward. The engaging portions 34a engage notches 11j formed in the wall portions 11a of the housing main body 11 (see FIG. 1).

As shown in FIG. 3, the first ribs 31 are wall-like and extend in the lateral direction. The first ribs 31 and the hooks 34 are connected to each other so as to form a single wall extending the entire lateral direction. This configuration provides better insulating performance to the connector 1 than a configuration in which a space is formed between the middle hooks 34 and the first ribs 31.

The cover 30 shown in FIG. 3 has two first ribs 31 arranged side by side in the lateral direction (along the front edge of the cover 30). The cover 30 also has two first ribs 31 arranged side by side in the lateral direction (along the rear edge of the cover 30). The middle hooks 34 are positioned between the two first ribs 31 arranged side by side in the lateral direction. The middle hooks 34 are connected to the two first ribs 31, and the two first ribs 31 and the hooks 34 interposed between them together form a large wall.

As shown in FIG. 3, the first ribs 31 have a main portion 31a to the left or right of the middle hooks 34, and a connecting portion 31b connected to both the main portion 31a and the middle hooks 34. The connecting portions 31b are wall-like and have a protruding length (vertical length) that is smaller than the main portion 31a. The connecting portion 31b allows the middle hooks 34 to be elastically deformed (deflected) smoothly.

When the cover 30 is attached to the housing 10, first ribs 31 are positioned to the front and to the rear of the conductive member 21. More specifically, the main portions 31a of the first ribs 31 are positioned to the front and to the rear of the conductive member 21. This improves insulating performance with respect to the conductive member 21. A middle hook 34 is positioned to the front and to the rear of the diode 22.

As described above, grooves 11c are formed in the wall portions 11a of the housing main body 11 to receive the inserted first ribs 31. As shown in FIG. 2, two grooves 11c are formed side by side in the lateral direction in both the front wall portion 11a and the rear wall portion 11a. Holes 11i are formed between the two grooves 11c to receive the middle hooks 34. The grooves 11c extend from the holes 11f receiving the corner hooks 33 to the holes 11i receiving the middle hooks 34. The length of the first ribs 31 in the lateral direction corresponds to the length of the grooves 11c. Grooves 11e and first ribs 31 of this length improve the insulating performance of the connector 1.

The first ribs 31 in this example have an inclined portion 31c which is inclined towards the main portion 31a. The inclined portions 31c are positioned on the ends close to the corner hooks 33. When the cover 30 is attached to the housing 10, the inclined portions 31c are positioned to the outside of the corners C of the housing chamber S (see FIG. 2). The insulating distance can be increased by the inclined portions 31c on a straight line extending at an angle through the corners C of the housing chamber S (a straight line that inclines both longitudinally and lateral). The grooves 11c in which the first ribs 31 are inserted conform to the shape of the first ribs 31 and have an inclined portion on the end.

As shown in FIGS. 4-5, a ring-like sealing member 36 is provided on the cover 30 to seal the space between the cover 30 and the housing 10. The sealing member 36 is arranged to the inside of the ribs 31, 32. More specifically, as shown in FIGS. 3-5, the cover 30 has a protruding portion 37 protruding towards the housing 10 and having an outer profile that conforms to the inner profile of the housing chamber S. The protruding portion 37 in this example is rectangular and ring-shaped. The protruding portion 37 is positioned to the inside of the ribs 31, 32 and the hooks 33, 34. More specifically, the protruding portion 37 is positioned to the inside of the inner surfaces of the housing chamber S. The four edges of the protruding portion 37 are arranged along the inner surfaces of the housing chamber S. The sealing member 36 is made of an elastic material such as rubber, and the elastic force of the member holds the protruding portion 37 in place. The sealing member 36 is interposed between the protruding portion 37 and the inner surfaces of the housing chamber S. By arranging the sealing member 36 to the inside of the ribs 32, 31 in this way, any increase in the size of the housing main body 11 can be restrained.

The following is an explanation of the internal structure of the housing chamber S. As shown in FIG. 4, a pedestal portion 11n is formed inside the housing chamber S, and the third connecting portion 21c of the conductive member 21 is arranged on the top surface. A hole is formed in the pedestal portion 11n, and an extended portion 21d extending from the third connecting portion 21c is inserted into the hole. This secures the conductive member 21 to the pedestal portion 11n. In this example, two pedestal portion 11n are positioned inside in the lateral direction. A diode 22 is arranged between the two pedestal portions 11n. The pedestal portions 11n are formed towards the rear of the housing chamber S. An opening 11m is formed in the front portion of the housing chamber S to receive the second connecting portion 21b of the conductive member 21 described above. As shown in FIG. 4, the first ribs 31 described above extend to a position lower than the top surface of the pedestal portions 11n.

As explained above, the housing 10 has a housing chamber S open on top, and an opening 12b formed in the lateral direction for receiving an inserted connector 92. A conductive member 21 connected to the receptacle terminal of the cable 90 is housed inside the housing chamber S. A cover 30 is attached to the housing 10 in the vertical direction and is used to close the housing chamber S. A plurality of ribs are formed in the cover 30 so as to protrude towards the housing 10 and surround the housing chamber S. Grooves 11c, 11d are formed in the housing 10 for insertion of the ribs. The plurality of ribs formed in the cover 30 include first ribs 31 positioned to the front or rear of the housing chamber S and second ribs 32 positioned to the sides of the opening 12b relative to the housing chamber S. In this way, the connector 1 is able to lengthen the insulating distance from the conductive member 21 to the outside surface of the housing 10 while curtailing any increase in the size of the connector.

The Present Disclosure is not limited to the embodiment explained above as various modifications are possible. For example, the following modifications can be made. The first ribs 31 and the second ribs 32 may be formed in the housing 10. Alternatively, the first ribs 31 may be formed on the cover 30, and the second ribs 32 may be formed on the housing 10. The first 31 and the second ribs 32 may also be connected to each other. The number of openings 12b for insertion of another connector 92 and the number of conductive members 21 may be one each. The first ribs 31 and the middle hooks 34 do not have to be connected to each other. The connector 1 may also include only one of either middle hooks 34 or corner hooks 33. For example, the connector I may have only corner hooks 33. Finally, the positions of the hooks may be changed if necessary.

While a preferred embodiment of the Present Disclosure is shown and described, it is envisioned that those skilled in the art may devise various modifications without departing from the spirit and scope of the foregoing Description and the appended Claims.

What is claimed is:

1. A connector, the connector comprising:
   a housing, the housing having first and second wall portions and first and second side portions, the first and second wall portions and the first and second side portions defining a chamber of the housing, the chamber being open at an upper end thereof, at least one of the first and second wall portions defining at least one wall groove at an upper end thereof, at least one of the first and second side portions defining at least one side groove at an upper end thereof, at least one of the first and second side portions having an opening extending therethrough which is in communication with the chamber;
   at least one conductive member, the at least one conductive member being housed within the chamber of the housing, wherein the at least one conductive member is configured to be electrically connected to a separate connector via the opening; and
   a cover, the cover having a ceiling portion, at least one first rib, and at least one second rib, each first and second rib extending downwardly from the ceiling portion, each first rib being positioned within a corresponding wall groove, each second rib being positioned within a corresponding side groove, whereby the cover closes off the chamber from the upper end thereof.

2. The connector according to claim 1, further comprising a ring-shaped sealing member, the ring-shaped sealing member being secured to a bottom surface of the ceiling portion of the cover, the ring-shaped sealing member being positioned to the inside of the at least one first rib and the at least one second rib.

3. The connector according to claim 1, wherein each side groove is shallower than each wall groove, and wherein each first rib extends further downwardly from the ceiling portion than each second rib.

4. The connector according to claim 1, wherein each of the first and second side portions have the opening extending therethrough which is in communication with the chamber.

5. The connector according to claim 1, wherein each of the first and second side portions define the side groove at the upper end thereof, and wherein the cover has a pair of second ribs, a first one of the second ribs being positioned in the side groove of the first side portion and a second one of the second ribs being positioned in the side groove of the second side portion.

6. The connector according to claim 5, further comprising a ring-shaped sealing member, the ring-shaped sealing member being secured to a bottom surface of the ceiling portion of the cover, the ring-shaped sealing member being positioned to the inside of the at least one first rib and the pair of second ribs.

7. The connector according to claim 1, wherein each of the first and second side portions define inner and outer side grooves at the upper end thereof, and wherein the cover has two pairs of second ribs, each pair of second ribs having an outer second rib and an inner second rib which is positioned inward from the outer second rib, the outer second rib of the first pair of second ribs being positioned in the outer side groove of the first side portion, the inner second rib of the first pair of second ribs being positioned in the inner side groove of the first side portion, the outer second rib of the second pair of second ribs being positioned in the outer side groove of the second side portion, and the inner second rib of the second pair of second ribs being positioned in the inner side groove of the second side portion.

8. The connector according to claim 1, wherein the cover further comprises a plurality of corner hooks, each corner hook extending downwardly from a respective corner of the ceiling portion, and wherein the housing has a plurality of holes defined therein which are open at an upper end thereof, each corner hook being positioned and secured within a corresponding one of the holes when the cover closes off the chamber from the upper end thereof.

9. The connector according to claim 8, further comprising a ring-shaped sealing member, the ring-shaped sealing member being secured to a bottom surface of the ceiling portion of the cover, the ring-shaped sealing member being positioned to the inside of the at least one first rib, the at least one second rib, and the plurality of corner hooks.

10. The connector according to claim 1, wherein the first wall portion defines first and second wall grooves, and wherein the second wall portion defines third and fourth wall grooves, and wherein the cover has four first ribs, wherein a first one of the first ribs is positioned within the first wall groove, wherein a second one of the first ribs is positioned within the second wall groove, wherein a third one of the first ribs is positioned within the third wall groove, and wherein a fourth one of the first ribs is positioned within the fourth wall groove.

11. The connector according to claim 10, further comprising a ring-shaped sealing member, the ring-shaped sealing member being secured to a bottom surface of the ceiling portion of the cover, the ring-shaped sealing member being positioned to the inside of the four first ribs and the at least one second rib.

12. The connector according to claim 10, wherein the cover further comprises first and second middle hooks, the first middle hook extending downwardly from the ceiling portion at a position between the first one of the first ribs and the second one of the first ribs, the second middle hook extending downwardly from the ceiling portion at a position between the third one of the first ribs and the fourth one of the first ribs, and wherein the housing has first and second holes defined therein which are open at an upper end thereof, the first hole being positioned between the first and second wall groove, the second hole being positioned between the third and fourth wall groove, wherein, when the cover closes off the chamber from the upper end thereof, the first middle hook is positioned and secured within the first hole and the second middle hook is positioned and secured within the second hole.

13. The connector according to claim 12, wherein the first middle hook is connected to the first and second ones of the first ribs, and wherein the second middle hook is connected to the third and fourth ones of the first ribs.

14. The connector according to claim 12, further comprising a ring-shaped sealing member, the ring-shaped sealing member being secured to a bottom surface of the ceiling portion of the cover, the ring-shaped sealing member being positioned to the inside of the first ribs, the at least one second rib, and the first and second middle hooks.

15. The connector according to claim 12, wherein the cover further comprises a plurality of corner hooks, each corner hook extending downwardly from a respective corner of the ceiling portion, and wherein the housing has a plurality of corner holes defined therein which are open at an upper end thereof, each corner hook being positioned and secured within a corresponding one of the corner holes when the cover closes off the chamber from the upper end thereof.

16. A connector, the connector comprising:
a housing, the housing having first and second wall portions and first and second side portions, the first and second wall portions and the first and second side portions defining a chamber of the housing, the chamber being open at an upper end thereof, at least one of the first and second side portions having an opening extending therethrough which is in communication with the chamber;
at least one conductive member, the at least one conductive member being housed within the chamber of the housing, wherein the at least one conductive member is configured to be electrically connected to a separate connector via the opening;
a cover, the cover having a ceiling portion which closes off the chamber from the upper end; and
a positioning assembly, the positioning assembly having at least one first rib and at least one second rib, the positioning assembly further having at least one first groove and at least one second groove, whereby when the cover closes off the chamber from the upper end, each first rib is positioned within a corresponding first groove, and each second rib is positioned within a corresponding second groove, wherein each first rib is operatively associated with one of the housing and the cover, and wherein each first groove is operatively associated with the housing when each first rib is operatively associated with the cover and is operatively associated with the cover when each first rib is operatively associated with the housing, and wherein each second rib is operatively associated with one of the housing and the cover, and wherein each second groove is operatively associated with the housing when each second rib is operatively associated with the cover and is operatively associated with the cover when each second rib is operatively associated with the housing.

17. The connector according to claim 16, wherein each first rib is operatively associated with the cover and each first groove is operatively associated with the housing.

18. The connector according to claim 16, wherein each second rib is operatively associated with the cover and each second groove is operatively associated with the housing.

19. A connector, the connector comprising:

a housing, the housing having first and second wall portions and first and second side portions, the first and second wall portions and the first and second side portions defining a chamber of the housing, the chamber being open at an upper end thereof, at least one of the first and second wall portions defining at least one wall groove at an upper end thereof, the first and second side portions each defining inner and outer side grooves at an upper end thereof, at least one of the first and second side portions having an opening extending therethrough which is in communication with the chamber;

at least one conductive member, the at least one conductive member being housed within the chamber of the housing, wherein the at least one conductive member is configured to be electrically connected to a separate connector via the opening; and a cover, the cover having a ceiling portion, at least one first rib, and a pair of second rib sets, each second rib set having an outer second rib and an inner second rib, each first rib extending downwardly from the ceiling portion, each first rib being positioned within a corresponding wall groove, each second rib extending downwardly from the ceiling portion, each outer second rib being positioned within a corresponding outer side groove, each inner second rib being positioned within a corresponding inner side groove, whereby the cover closes off the chamber from the upper end thereof.

* * * * *